Sept. 6, 1949.   A. BARNES   2,481,189
IMAGE-CARRYING ELEMENT FOR LIGHT-POLARIZING IMAGES
Filed June 14, 1946
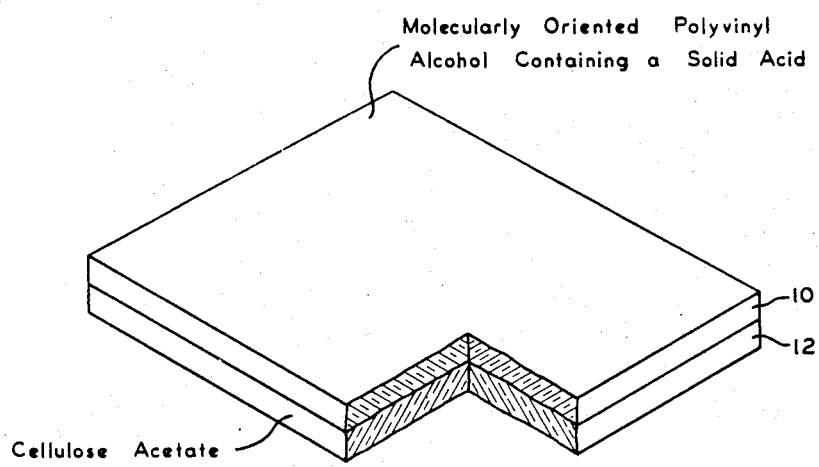
INVENTOR.
Arthur Barnes
BY Donald L. Brown
Attorney Patented Sept. 6, 1949

2,481,189

UNITED STATES PATENT OFFICE 2,481,189

IMAGE-CARRYING ELEMENT FOR LIGHT-POLARIZING IMAGES

Arthur Barnes, Waltham, Mass., assignor to Polaroid Corporation, Cambridge, Mass., a corporation of Delaware Application June 14, 1946, Serial No. 676,839

2 Claims. (Cl. 88—65)

This invention relates to sheet materials adapted to have iodine images formed therein, and more particularly to a sheet of molecularly oriented plastic adapted to serve as a carrier for such images and to form a dichroic sorption complex with the iodine of the image.

Objects of the present invention are to provide an image-carrying element capable of causing iodine to be released from an iodide when the element is brought into contact with an image-carrying layer which contains an image in terms of an oxidizing agent and especially to an image-carrying element of the character described having an image-receiving layer comprising a plastic sheet material which is capable of forming a dichroic sorption complex with iodine and which has a greater affinity for iodine than the material in which the oxidizing image is contained.

Another object is to provide an image-carrying element comprising a plastic sheet having therein a substance adapted to cause the release of iodine from an iodide solution when an image formed of an oxidizing agent, which has been immersed in said iodide solution, is brought in contact with said plastic sheet.

A further object is to provide an image-carrying element comprising a base and a sheet of plastic having incorporated therein means for effecting the release of iodine from an iodide solution, said means becoming operative only when said plastic sheet is brought into contact with an image formed of an oxidizing agent.

Still another object resides in the provision of an image-carrying element having an image-receiving layer of a molecularly oriented plastic of the character in which light-polarizing images in iodine may be formed, said layer having an acid on or within its surface.

The invention accordingly comprises the product possessing the features, properties and the relation of components which are exemplified in the product hereinafter described, and the scope of the application of which will be indicated in the claims.

For a fuller understanding of the nature and objects of the invention, reference should be had to the following detailed description, taken in connection with the accompanying drawing.

In a preferred form, the product of the present invention comprises a sheet 10 of transparent, molecularly oriented plastic of the type adapted to form a dichroic sorption complex with iodine, with an acid cast therein or coated on its surface. This plastic is preferably a high molecular weight polymer containing hydroxyl groups. Examples of suitable polymers are polyvinyl alcohol, partially hydrolyzed polyvinyl acetals such as polyvinyl butyral, and polyvinyl alcohol esters. Of the materials falling within this class, the preferred material is polyvinyl alcohol, and images formed in properly prepared sheets of that material possess the highest dichroism and hence are more suitable in the production of dichroic images.

In order to obtain the best results with respect to dichroism in the images of the present invention, at least the surface molecules of the plastic sheet should be oriented to substantial parallelism. This may be conveniently accomplished by softening the sheet, as for example by subjecting to heat and then stretching or extending the sheet until suitable orientation of the molecules has been obtained. In the case of polyvinyl alcohol, a sheet formed by casting may be placed in satisfactory condition for the formation of dichroic images therein by subjecting the sheet to mechanical stress as, for example, by stretching in a uniform direction until the molecules therein are sufficiently oriented. A stretch of from two to six times the original length of the sheet is sufficient for this purpose. The surface molecules of the sheet may also be oriented by the application of linear frictional force thereto without orienting the molecules of the rest of the sheet.

The acid may be combined with the sheet by casting, imbibing, or by coating the acid on the surface of the sheet. It is preferred to add the acid to the polyvinyl alcohol solution and cast them together. Suitable acids for this purpose are organic, nonoxidizing acids which are solid at temperatures preferably not lower than 20° C., for example, chloracetic, bromacetic, citric, α-bromopropionic and maleic acid. Of these, maleic is preferred, and may be used in proportions ranging from 3% to 15%.

The oriented plastic sheet of the present invention may be supported on a sheet 12 of a transparent plastic as, for example, a cellulosic plastic such as cellulose acetate and cellulose nitrate, or a vinyl compound such as the vinyl acetals, vinyl acetate, vinyl chloride, the vinyl acetate-vinyl chloride copolymers, or a condensation type superpolymer such as a polyamide or nylon-type plastic. Cellulose acetate is a preferred material for the support, and to form the most satisfactory base for a dichroic image, there is bonded to at least one face of a sheet of said acetate a sheet of molecularly oriented polyvinyl alcohol having a hydroxyl content preferably in excess of 50%, said polyvinyl alcohol sheet being uniformly oriented throughout its entire thickness and said sheet having a solid organic acid cast therein.

Examples I and II below are given to illustrate the formation of the novel sheet of the invention, and Examples III and IV to illustrate its use. In all cases it will be understood that the proportions may be varied within wide ranges and that the ingredients may also be varied as will be evident to those skilled in the art.

Example I

A solution comprising 10 grams of maleic acid and 100 grams of polyvinyl alcohol is cast to a thickness of .02 inch. When it is dry, it is removed, stretched to three or more times its original length to orient its molecules, and laminated to a cellulose acetate base.

Example II

A sheet of molecularly oriented polyvinyl alcohol is dipped in a solution comprising 10 grams of maleic acid, 90 cc. of methanol and 10 cc. of water, for example for 20 seconds, and allowed to dry slowly. The sheet is preferably held under tension during the drying to prevent it from relaxing and becoming disoriented.

Example III

A silver halide emulsion, mounted on a paper or film base, is exposed, developed and stopped, in accordance with conventional photographic methods. It is preferably washed in water and is then immersed in a bath consisting of:

|  | Cubic centimeters |
|---|---|
| Ammonium oxalate, saturated solution | 100 |
| Cupric sulfate, 10% solution | 20 |
| Potassium ferricyanide, 10% solution | 15 |
| Oxalic acid, saturated solution | 5 |

The bath is preferably prepared by mixing the ingredients in the order in which they are named and is maintained at approximately room temperature. The time required for this step of the process is not critical since reactions to completion are involved, immersion for two minutes or more giving good results.

The print is then washed in a 5% sodium thiosulfate solution to remove the silver salts, and then with water. It is immersed in a 1.5% solution of sodium hydroxide for several seconds and is then washed in water and placed in 10% solution of potassium iodide. The print is then brought in contact with the novel sheet of the invention, which in this instance, comprises a layer of molecularly oriented polyvinyl alcohol containing maleic acid. Iodine is released and transferred to said polyvinyl alcohol sheet to give the desired dichroic image. It is preferable to immerse the print in a final fixing bath, which bath contains boric acid to stabilize the dichroic image. The fixing bath may also contain sodium sulfate to prevent softening of the sheet, potassium iodide to provide a control for the color of the image and in some instances a weak solution of sodium thiosulfate.

Example IV

|  | Cubic centimeters |
|---|---|
| Ammonium iodide, 20% solution | 250 |
| Ammonium chloride, 20% solution | 100 |
| Sodium hydroxide, 10% solution | 150 |
| Cupric chloride, 10% solution | 125 |

When a silver image is immersed in a solution having approximately the foregoing formula, it is bleached to a light slate blue in color and should be allowed to soak until said color change is complete, which should be accomplished in about thirty seconds. The precise reactions producing this result are not definitely known, but it appears that the silver is converted to silver iodide and it is thought that the ammonia and cupric and iodide ions combine to form a complex compound, probably tetramine cupric iodide, which compound is adsorbed on or otherwise attached to the silver iodide, thus producing the slate blue color. The density of any unit area of the original image is determined by the amount of silver present in that area—the more silver, the darker the area. Accordingly, the amount of the above complex adsorbed in any unit area of the print depends upon the amount of silver initially deposited in that area.

It should be pointed out that the above step may, if desired, be divided into two parts. In the first, the silver in the image may be converted to a silver salt, preferably non-water soluble, by any conventional photographic bleaching or toning bath. As a second step, the bleached image may then be permitted to adsorb the cupric-ammonia-iodide complex from the foregoing solution.

After the foregoing reactions are completed, the next step is to remove from the gelatin of the print the excess solution and complex which has not been adsorbed on the silver iodide, as by washing in a solution which will not disturb the silver iodide or the complex adsorbed thereon. This may be done by washing in plain water, but due to the degree of control which must be exercised to prevent removal of the complex adsorbed on the silver iodide, it is preferable to add to the washing solution small amounts of the ingredients used in the first solution. A satisfactory bath for this purpose may be made up approximately as follows:

|  | Cubic centimeters |
|---|---|
| Ammonium iodide, 20% solution | 107 |
| Ammonium chloride, 20% solution | 80 |
| Sodium hydroxide, 10% solution | 119 |
| Cupric chloride, 10% solution | 100 |

For the best results, one part of the above solution should be mixed with seven parts of water, and the print will be sufficiently washed after about thirty seconds therein. It will then comprise a suspension in a layer of gelatin, on the paper or other backing, of silver iodide or other silver salt having the above complex adsorbed thereon. It should be understood that the term "adsorbed" as used herein is to be construed as including the possibility of chemical combination. The amount of said complex present in any unit area will be proportional to the amount of silver originally present therein. Accordingly the image will be the same as the original silver image, but the variations in density therein will be rendered in varying tones of light slate blue.

The next step in the process is to treat the image with a solution which will release free iodine from the above-mentioned complex, which may be accomplished by a variety of solutions which will act to break down the complex. A simple method is to treat the complex with an acid which will neutralize the ammonia to $NH_4$.

The print is placed with its emulsion side against the oriented surface of a sheet of polyvinyl alcohol or other plastic sheet which contains, for example, 10% by weight of maleic acid. During the above step, the iodine is released from the complex and transferred from the gelatin to the oriented surface of the plastic sheet. Moreover, since the amount of iodine present varies throughout the area of the gelatin layer, depending upon the density of the original image therein, the plastic sheet is differentially stained proportionally to the density of the original image, thus producing a positive dichroic reproduction of the original silver image in the print.

Since certain changes may be made in the above product and different embodiments of the invention could be made without departing from the scope thereof, it is intended that all matter contained in the above description or shown in the accompanying drawing shall be interpreted as illustrative and not in a limiting sense.

What is claimed is:

1. An image-carrying element having, in combination, a base layer, an image-receiving layer superposed on said base layer, said image-receiving layer comprising a polyvinyl compound which is selected from the class consisting of polyvinyl alcohol, partially hydrolyzed polyvinyl acetals and polyvinyl alcohol esters and which has its molecules oriented substantially in parallelism, and maleic acid, which is in solid form and which is water soluble, incorporated throughout at least a portion of said image-receiving layer adjacent that surface of the image-receiving layer most distant from said base layer, whereby said maleic acid is removable from said image-carrying element upon contact of an aqueous solution with said image-receiving layer.

2. In an image-carrying element having a base layer, in combination, an image-receiving layer supported on said base layer, said image-receiving layer comprising a polyvinyl compound which is selected from the class consisting of polyvinyl alcohol, partially hydrolyzed polyvinyl acetals and polyvinyl alcohol esters and which has its molecules oriented substantially in parallelism, and an acid contained by said image-receiving layer at least throughout a stratum thereof adjacent the surface of said image-receiving layer most distant from said base layer, said acid being characterized by being in solid form at temperatures at least as high as 20° C. and of a water-soluble character as well as possessing the characteristic of reacting with an oxidizing agent for effecting the release of an iodine from an iodide, whereby said acid is removable from said image-carrying element upon contact of an aqueous solution with said image-receiving layer.

ARTHUR BARNES.

REFERENCES CITED

The following references are of record in the file of this patent:

UNITED STATES PATENTS

| Number | Name | Date |
|---|---|---|
| 568,496 | Schoenfelder et al. | Sept. 29, 1896 |
| 642,941 | West | Feb. 6, 1900 |
| 742,405 | Eichengrun | Oct. 27, 1903 |
| 2,169,250 | Izard | Aug. 15, 1939 |
| 2,373,035 | Land | Apr. 3, 1945 |
| 2,409,923 | Barnes-Husek | Oct. 22, 1946 |

FOREIGN PATENTS

| Number | Country | Date |
|---|---|---|
| 497,373 | Great Britain | Dec. 19, 1938 |
| 526,780 | Great Britain | Sept. 25, 1940 |